United States Patent
Himmelsbach et al.

(10) Patent No.: US 8,815,046 B2
(45) Date of Patent: Aug. 26, 2014

(54) DOUBLE-SIDED ADHESIVE TAPE FOR AFFIXING PROTECTIVE SHEETLIKE STRUCTURES

(75) Inventors: Peter Himmelsbach, Buxtehude (DE); Arne Barkley, Winseldorf (DE); Nicolai Böhm, Hamburg (DE); Carsten Böhmer, Hamburg (DE); Stefan Sell, Kaltenkirchen (DE)

(73) Assignee: tesa SE, Hamburg (DE)

( * ) Notice: Subject to any disclaimer, the term of this patent is extended or adjusted under 35 U.S.C. 154(b) by 24 days.

(21) Appl. No.: 12/987,560

(22) Filed: Jan. 10, 2011

(65) Prior Publication Data

US 2011/0100550 A1  May 5, 2011

Related U.S. Application Data

(62) Division of application No. 12/210,599, filed on Sep. 15, 2008, now abandoned.

(30) Foreign Application Priority Data

Sep. 17, 2007 (DE) .................. 10 2007 044 322

(51) Int. Cl.
*B32B 27/00* (2006.01)

(52) U.S. Cl.
USPC ........... 156/332; 156/338; 428/349; 428/356; 428/343

(58) Field of Classification Search
CPC ......... C08L 23/18; C08L 23/20; C08L 23/22; C08L 33/02; C09J 123/18; C09J 23/20; C09J 23/22; C09J 2203/306; C09J 2201/134; C09J 133/02
USPC .............. 156/60, 244.11, 230, 231, 238, 240, 156/245, 250, 256, 133, 334, 43, 332; 428/141, 343, 41.9, 354, 355 R, 356, 428/349, 214

See application file for complete search history.

(56) References Cited

U.S. PATENT DOCUMENTS

| | | | |
|---|---|---|---|
| 5,925,453 A * | 7/1999 | Kase et al. ................ | 428/323 |
| 2005/0263243 A1 * | 12/2005 | Schumann et al. ........ | 156/289 |
| 2006/0240209 A1 * | 10/2006 | Sano ........................ | 428/40.1 |
| 2006/0246282 A1 * | 11/2006 | Bohm et al. ............. | 428/355 EN |
| 2007/0018475 A1 * | 1/2007 | McGinnis et al. ....... | 296/39.1 |
| 2008/0084083 A1 * | 4/2008 | Boddie et al. ........... | 296/39.1 |

* cited by examiner

*Primary Examiner* — Tom Dunn
*Assistant Examiner* — Vishal I Patel
(74) *Attorney, Agent, or Firm* — Norris McLaughlin & Marcus PA

(57) ABSTRACT

Double-sided adhesive tape for affixing large sheetlike structures for the purposes of transit protection and/or assembly protection to substrates such as an automotive finish, consisting of a first adhesive side A comprising an adhesive A with a coatweight of greater than 10 g/m² and a bond strength of at least 0.2 N/cm and of a second adhesive side B comprising an adhesive B having a melting point greater than 50° C., at least one of the adhesives, A or B, being self-adhesive and suitable for reversible bonding.

10 Claims, No Drawings

DOUBLE-SIDED ADHESIVE TAPE FOR AFFIXING PROTECTIVE SHEETLIKE STRUCTURES

This application is a Divisional application of Ser. No. 12/210,599, filed Sep. 15, 2008, which claims priority to German application 10 2007 044 322.8 filed Sep. 17, 2007.

The present invention relates to a double-sided adhesive tape for affixing protective sheetlike structures.

Surfaces, especially in the automotive industry, are being protected more and more often. Particularly in the context of the protection of a complete vehicle, the systems under development are more and more innovative. Examples are wax preservation, transit protection films, and full protection or partial protection of covers.

These systems are intended to afford protection against:
mechanical damage (scratches),
industrial dust and soiling of any kind,
fly rust and fine sparks,
oil soot and abrasion from overhead lines (rail),
animal secretions, bird droppings, tree resins and pollen,
climatic and other environmental effects.

Wax preservation is disadvantageous from an environmental standpoint and is subject to increasingly stringent statutory impositions. With the protective covers, fastening is a challenge. It is important to protect the vehicle against penetration by soiling and by water. In certain cases, here, adhesive tapes are attached which are bonded to sensitive substrates. The requirements imposed on these adhesive tapes are very comprehensive.

Advantageous products are those which do not give rise to any inherent detachment or destruction and do not give rise to any instances of damage to the vehicle surface and mounted components. Resistance is desired for transit at a speed of up to 160 km/h.

The materials must have sufficient mechanical strength after 24 h at −40° C. and at +80° C., and also resistance at temperatures of −20° C. to +50° C., where they ought to be removable from the vehicle without complaint.

Under all kinds of weathering conditions, there must be no interactions with the surface finish (1-component and 2-component clearcoat finish), with trim components, with seals or with glazing.

In certain cases, for special vehicles, at least part of the protection means is to be equipped with materials having a water vapour permeability of at least 40 g/(m$^2$*d).

For the purpose of sealing and/or affixing, adhesive tapes emerge as being advantageous, but must be stitched or welded. In the case of stitching, a disadvantage is that entry holes are formed, through which soiling and water may pass beneath the protection means. Also a disadvantage are materials which, as a result of the stitching holes, lose stability to such an extent that they tear. Examples of this include adhesive tapes based on thin films. Furthermore, the operation is time-consuming and requires an apparatus. There are possibilities for error when carrying out positioning. As a result of the stitching, the remaining bond area is reduced; this stitching accounts, for example, for up to 30% of the adhesive material.

In the case of welding, only very specific materials are suitable. By way of example, it is not possible to weld fibrous sheetlike structures based on viscose staple or cotton, such as woven or nonwoven fabrics. Again, the surface of the sheetlike structure is altered, and the bond area is reduced significantly as a result of the processing operation. Depending on the weld point, the seam site may develop into a predetermined breaking point, which then no longer conforms to the requirements and—disadvantageously—parts. In addition, the operation is time-consuming and requires apparatus for the production operation.

It is an object of the invention to develop an adhesive tape which is suitable for adhesively bonding protective sheetlike structures to substrates and which does not have the known disadvantages of the prior art.

The object is achieved by means of a double-sided adhesive tape as set out in Claim 1. One alternative embodiment is subject matter of the co-independent Claim 10. The subclaims embrace advantageous versions of the subject matter of the invention, and also uses thereof.

The invention accordingly provides a double-sided adhesive tape for affixing large sheetlike structures for the purposes of transit protection and/or assembly protection to substrates such as an automotive finish, comprising of a first adhesive side A comprising an adhesive A with a coatweight of greater than 10 g/m$^2$ and a bond strength of at least 0.2 N/cm and of a second adhesive side B comprising an adhesive B having a melting point greater than 50° C., at least one of the adhesives, A or B, being self-adhesive and suitable for reversible bonding.

Alternatively the invention provides a double-sided adhesive tape for affixing large sheetlike structures for the purpose of transit and/or assembly protection to substrates such as automotive finishes, comprising of a first adhesive side A comprising an adhesive A which comprises isobutyl rubber or derivatives or blends thereof and of a second adhesive side B comprising an adhesive B which is based on polymers obtained from the polymerization of acrylic acid and derivatives thereof, preferably esters thereof.

The side of the adhesive tape with the adhesive B faces the large sheetlike structure in use and serves to affix it.

Generally speaking, the subject matter of the invention is composed of an adhesive tape having two adhesive layers. In one advantageous version these layers are supported by a backing material. This backing material may be a woven or knitted fabric, a scrim, nonwoven, film or paper, or composites and combination products thereof, based on natural or synthetic materials or a combination or a mixture thereof.

Accordingly and advantageously, use is made of polymeric films, nonwovens or woven fabrics made from polypropylene, polyester, polyamide, polyurethane or polyethylene, both alone and in combination with mineral fibres such as glass fibres or carbon fibres, or from products such as woven fabrics, scrims and knitted fabrics with cellulose or cotton fibres, and also of metallic origin. For special applications it is also possible to use mixing products such as compounded formulations or blended fibre product, where appropriate in the form of blended fibre filaments, yarns or twists. These may in some cases be coloured or otherwise equipped to give the backing material optical or mechanical features and properties.

In alternative versions it is also possible to use fibres of natural origin such as cotton, silk, flax or viscose staple.

In the alternative embodiment of the subject matter of the invention, a nonwoven is used as backing material for the masking of surfaces. This nonwoven is reinforced through the formation of stitches formed by meshes from the fibres of the nonwoven, the number of stitches on the nonwoven being advantageously at least 3/cm, preferably 5/cm to 50/cm.

The ultimate tensile strength of the subject matter of the invention is at least 10 N/cm, preferably 15 to 450 N/cm, more preferably 20 to 250 N/cm, the strength being based on the width of the subject matter of the invention.

The extension of the adhesive tape is generally less than 1500%. In the case of film-based backing materials it is between 10% and 1000%, preferably between 15% and 800%, more preferably between 15% and 500%. In the case of nonwoven-based backing materials it is between 10% and 400%, preferably between 15% and 300%, more preferably between 15% and 250%. Woven fabrics have an extensibility of 5% to 50%, preferably 5% to 25%.

In another advantageous embodiment the subject matter of the invention can be torn by hand perpendicularly with respect to the orientation and/or in the direction of the stitches. This is frequently employed when the product of the invention is wound up on itself to form a roll.

In the case of another embodiment this tearability is unnecessary. In this case the products in question may be diecut products for bonding to the large sheetlike structures.

The adhesive tape preferably comprises substances which absorb UV light.

For the purposes of classification the adhesive sides are referred to as A and B.

The self-adhesive coating of the adhesives is possible both by direct coating and by transfer coating. In the case of transfer coating, an auxiliary support such as release paper, release film, a roll or belt is coated first and the backing itself is then introduced. A further possibility is to apply the adhesive partially to the backing, as for example by patterned printing, screen printing, thermal flexographic printing or gravure printing. Coating over a full area is likewise possible, however. Spinning or spraying may give the product particular properties.

The subject mater of the invention may have been lined on one or both sides with an adhesive liner.

There are also further processing steps such as laminating, diecutting, printing, neutralizing, activating, crosslinking, slitting, punching, embossing and other techniques to be found in the prior art.

For the coating operation a self-adhesive composition is preferred which has a high bond strength. Adhesives which can be used are, advantageously, self-adhesive compositions based on natural and synthetic rubbers and on other synthetic polymers such as acrylates, methacrylates, polyurethanes, polyolefins, polyvinyl derivatives, polyesters or silicones, with corresponding additives such as tackifier resins, plasticizers, stabilizers and other auxiliaries, such as fillers where necessary.

Thermoplastic hot-melt adhesives more particularly have advantageous properties and are favoured on production grounds.

Preferred hot-melt adhesives based on block copolymers are notable for their diverse possibilities for variation: the deliberate reduction of the glass transition temperature of the self-adhesive composition through the selection of the tackifiers, the plasticizers and also the size of the polymer molecule and the molecular distribution of the ingredients ensures the necessary, functionally appropriate bonding to the substrate, even at critical points of the human locomotor apparatus.

The high shear strength of the hot-melt adhesive is achieved through the high level of cohesiveness of the polymer. The effective tack is a product of the range of tackifiers and plasticizers employed.

For particularly strongly adhering systems, the hot-melt adhesive is based preferably on block copolymers, more particularly A-B or A-B-A block copolymers or mixtures thereof. The hard phase, A, is primarily polystyrene or its derivatives, and the soft phase, B, contains ethylene, propylene, butylene, butadiene, isoprene, isobutylene or mixtures thereof, here more preferably isoprene or mixtures therewith.

In one advantageous version the hot-melt adhesive has the composition indicated below:

| | |
|---|---|
| 10% to 90% by weight | block copolymers, |
| 5% to 80% by weight | tackifiers such as oils, waxes, resins and/or mixtures thereof, preferably mixtures of resins and oils, |
| less than 60% by weight | plasticizers, |
| less than 15% by weight | additives, |
| less than 5% by weight | stabilizers. |

The aliphatic or aromatic oils, waxes and resins serving as tackifiers are preferably hydrocarbon oils, waxes and resins, the oils, such as paraffinic hydrocarbon oils, or the waxes, such as paraffinic hydrocarbon waxes, having a favourable effect on bonding to the skin by virtue of their consistency. Plasticizers used are medium-chain or long-chain fatty acids and/or their esters. These adjuvants serve to adjust the adhesive properties and the stability. Where appropriate, further stabilizers and other auxiliaries are employed.

On the adhesive side B, the adhesive tape of the invention has a bond strength to steel of at least 0.5 N/cm (coating width), especially a bond strength of between 1.0 N/cm and 25 N/cm, more preferably 1.5 to 22 N/cm. On other substrates, different bond strengths may be achieved. The melting point of the adhesive B is greater than 50° C., preferably between 60° C. and 300° C. and more preferably between 70° C. and 150° C.

The coatweight for the adhesive side B is preferably more than 12 g/m². In advantageous versions it is between 15 and 120 g/m² and with particular advantage between 17 g/m² and 80 g/m².

On the adhesive side A, the adhesive tape of the invention has a bond strength to steel of at least 0.2 N/cm (coating width), especially a bond strength of between 0.5 N/cm and 10 N/cm, more preferably 0.5 to 7 N/cm. Again, on different substrates, other bond strengths may be achieved. The coatweight for the adhesive side A is more than 10 g/m². In advantageous versions it is between 12 and 120 g/m² and with particular advantage between 17 g/m² and 80 g/m².

With further preference the adhesives may be reactive.

It has further emerged as being advantageous for the subject matter of the invention to have a basis weight of less 500 g/m². For flat adhesive bonds it is preferred to use 20 to 400 g/m², more preferably 30 to 300 g/m².

The adhesive tapes of the invention can be used with particular advantage for the bonding of a sheetlike structure for the purpose of protection in transit or assembly to a substrate, the sheetlike structure having dimensions of more than one square meter.

By sheetlike structures are meant, among other systems, full protection covers and partial protection covers, which may also have a three-dimensional form. The base area is greater than one square meter, preferably greater than two square meters, more preferably up to twelve square meters.

Advantageous forms are three-dimensional forms which approximate to the article to be protected, more particularly to the vehicle shape.

In one particularly preferred version the adhesive side B is affixed first to the large sheetlike structure, and at a later point in time the adhesive side A is bonded to the substrate it is desired to protect. This may take place for the purpose of sealing and/or for the purpose of affixing, the form of implementation then being different.

The adhesive facing the sheetlike structure preferably gives rise to a permanent adhesive bond which can no longer be removed without destruction With further preference the adhesive facing the article to be protected can be detached without residue from the substrate to be bonded.

The invention claimed is:

1. A method for protecting the surface of an automotive finish, said method comprising affixing a sheetlike structure to the surface of an automotive finish, said sheetlike structure comprising a double-sided adhesive tape, the tape comprising a first adhesive side comprising an adhesive A, said adhesive A consisting of isobutyl rubber, and optionally one or more of tackifiers, plasticizers and stabilizers, and having a coatweight of greater than 10 g/m$^2$ and a bond strength of at least 0.2 N/cm and of a second adhesive side comprising an adhesive B, wherein adhesive B consists of polymers obtained from a polymerization of acrylic acid, and optionally one or more of tackifiers, plasticizer and stabilizers, and having a melting point greater than 50° C., wherein at least one of the adhesives, A or B, is self-adhesive, and wherein adhesive A is bonded to the surface of the automotive finish and adhesive B is bonded to the sheet-like structure.

2. The method according to claim 1 wherein the tape comprises a film backing based on a polyolefin or compounded formulations thereof.

3. The method according to claim 1 wherein the adhesive tape is perforated or tearable in cross direction.

4. The method according to claim 1 wherein at least one of the adhesives, A or B, has been coated in a solvent-free process.

5. The method according to claim 1 wherein the basis weight of the adhesive tape is less than 300 g/m2, the coatweight of adhesive A being between 12 and 80 g/m2 and the coatweight of adhesive B being between 15 and 80 g/m2.

6. The method according to claim 1 wherein the isobutyl rubbers are based on block copolymers.

7. The method according to claim 1 wherein the sheet-like structure is a full protection cover having a base area greater than 2 m$^2$.

8. The method according to claim 1 wherein the sheet-like structure is a three-dimensional form approximate to the shape of a vehicle.

9. The method according to claim 1 wherein the tensile strength of the adhesive tape is at least 10 N/cm.

10. The method according to claim 1 wherein the extension of the adhesive tape is less than 1500%.

* * * * *